(12) United States Patent
Fidgen et al.

(10) Patent No.: US 7,937,839 B2
(45) Date of Patent: May 10, 2011

(54) POLE PRUNER

(76) Inventors: Jeffrey G. Fidgen, Post Falls, ID (US);
Scotty D. Bolling, Blacksburg, VA (US)

( * ) Notice: Subject to any disclaimer, the term of this patent is extended or adjusted under 35 U.S.C. 154(b) by 395 days.

(21) Appl. No.: 12/288,558

(22) Filed: Oct. 22, 2008

(65) Prior Publication Data

US 2010/0095532 A1 Apr. 22, 2010

(51) Int. Cl.
*B26B 13/28* (2006.01)
(52) U.S. Cl. .............. 30/135; 30/296.1; 30/231; 30/249
(58) Field of Classification Search .................. 30/124, 30/134, 135, 249, 231, 244, 245, 268, 269, 30/296.1
See application file for complete search history.

(56) References Cited

U.S. PATENT DOCUMENTS

| 594,072 A | * | 11/1897 | Forde ............................ 30/134 |
| 4,096,630 A | | 6/1978 | Honick |
| 4,420,883 A | | 12/1983 | Wallace et al. |
| 4,442,603 A | | 4/1984 | Wallace et al. |
| 4,464,837 A | * | 8/1984 | Amstutz ......................... 30/134 |
| 4,649,646 A | | 3/1987 | Lemcke |
| 5,241,752 A | * | 9/1993 | Lutzke et al. .................. 30/249 |
| 5,743,018 A | | 4/1998 | Wang |
| 6,647,627 B2 | * | 11/2003 | Nickel ............................ 30/135 |
| 6,694,621 B1 | * | 2/2004 | Boley et al. .................... 30/249 |
| 6,785,969 B2 | | 9/2004 | Wang |
| 2003/0110640 A1 | * | 6/2003 | Nickel ............................ 30/135 |

* cited by examiner

*Primary Examiner* — Kenneth E. Peterson
*Assistant Examiner* — Sean Michalski
(74) *Attorney, Agent, or Firm* — Dennis L. Thomte; Thomte Patent Law Office LLC

(57) ABSTRACT

An improved pole pruner for pruning a limb from a tree is provided which includes structure which grabs or grasps that portion of the tree limb to be detached as the cutting blade of the pole pruner severs the tree limb from the tree thereby preventing the severed tree limb from falling downwardly and injuring the operator of the pole pruner. The operator of the pole pruner may maneuver the pole pruner to a location wherein it is safe to release the severed tree limb from the pole pruner.

3 Claims, 5 Drawing Sheets

POLE PRUNER

BACKGROUND OF THE INVENTION

1. Field of the Invention

This invention relates to a pole pruner for trimming branches or limbs from a tree and more particularly to a pole pruner which has means associated therewith to grasp or grab the severed limb as it is being severed from the tree. The grasping or grabbing of the severed tree limb prevents the severed tree limb from falling downwardly onto the person performing the pruning operation.

2. Description of the Related Art

Non-limiting and non-exhaustive embodiments of the present invention are described with reference to the following figures, wherein like reference numerals refer to like parts throughout the various views unless otherwise specified.

Many types of pole pruners have been provided with the conventional pole pruners comprising an elongated handle having a hook at the upper end thereof which defines a U-shaped opening formed therein which is adapted to receive a limb to be pruned. A blade is pivotally mounted on the upper end of the pole and is adapted to move through the hook and the U-shaped opening formed therein to severe a portion of a tree limb from the tree. In the conventional pole pruners, once the limb has been severed from the tree, the severed limb falls downwardly from the tree and poses a danger to the person performing the pruning operation.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A pole pruner is described for severing or pruning a tree limb from a tree. A body member is mounted at the upper end of the pole and extends upwardly therefrom. The body member has a first hook, with first and second ends, provided thereon which defines an inverted U-shaped opening which is adapted to receive a tree limb therein. The first hook has a vertically disposed slot formed therein which communicates with the inverted U-shaped opening. An elongated generally flat cutting blade member, having upper and lower ends, is pivotally secured intermediate its length to the body member so as to have its lower end selectively movably positioned in the slot. The cutting blade member has a cutting edge formed therein at its lower end. The cutting blade member is pivotally movable from a non-pruning position to a pruning position. The cutting edge of the cutting blade member is positioned within the slot when the cutting blade is in its non-pruning position. The cutting edge is movable into the inverted U-shaped opening of the first hook when the cutting blade member is moved from its non-pruning position to its pruning position to cut or sever the tree limb positioned in the inverted U-shaped opening. A first spring is secured to the cutting blade member to yieldably maintain the cutting blade member in its non-pruning position. An elongated rope is secured to the cutting blade member to enable a person to pivotally move the cutting blade member from its non-pruning position to its pruning position.

A second hook is secured to the body member laterally of the first hook. The second hook defines an inverted U-shaped opening which is in lateral alignment with the U-shaped opening in the first hook. An elongated grabber arm, having upper and lower ends, is pivotally secured to the first hook at one side thereof between the first and second hooks. The grabber arm is movable between an inoperative position to an operative position. The grabber arm is normally in its inoperative position. The lower end of the grabber arm is positioned laterally of and in alignment with the U-shaped opening of the first hook. A spring is secured to and extends between the cutting blade member and the grabber arm so that when the cutting blade member is moved towards its pruning position, the grabber arm will be yieldably moved from its inoperative position to its operative position to force the detached portion of the limb against the second hook to grab the same as it is being cut from the limb.

It is therefore a principal object of the invention to provide an improved pole pruner.

It is a further object of the invention to provide an improved pole pruner which includes means associated therewith for grabbing or grasping the severed tree limb as it is being severed from the tree to prevent the severed tree limb from falling downwardly from the tree.

A further object of the invention is to provide a pole pruner of the type described which provides a safety measure for the person operating the pole pruner.

These and other objects will be apparent to those skilled in the art.

DESCRIPTION OF THE PREFERRED EMBODIMENT

Figure 1:
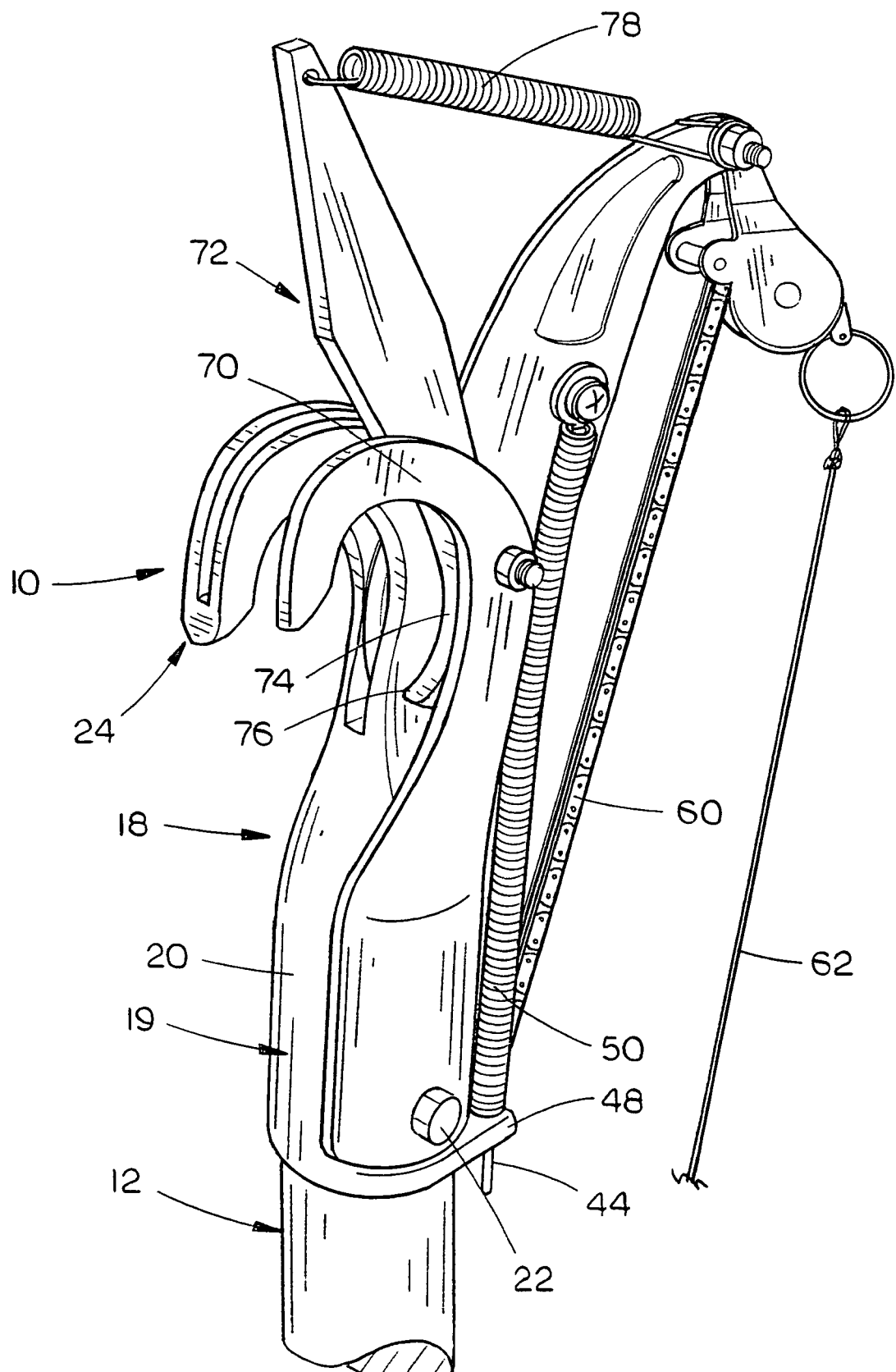
FIG. 1 is a perspective view of the upper end of the pole pruner of this invention.
Figure 2:
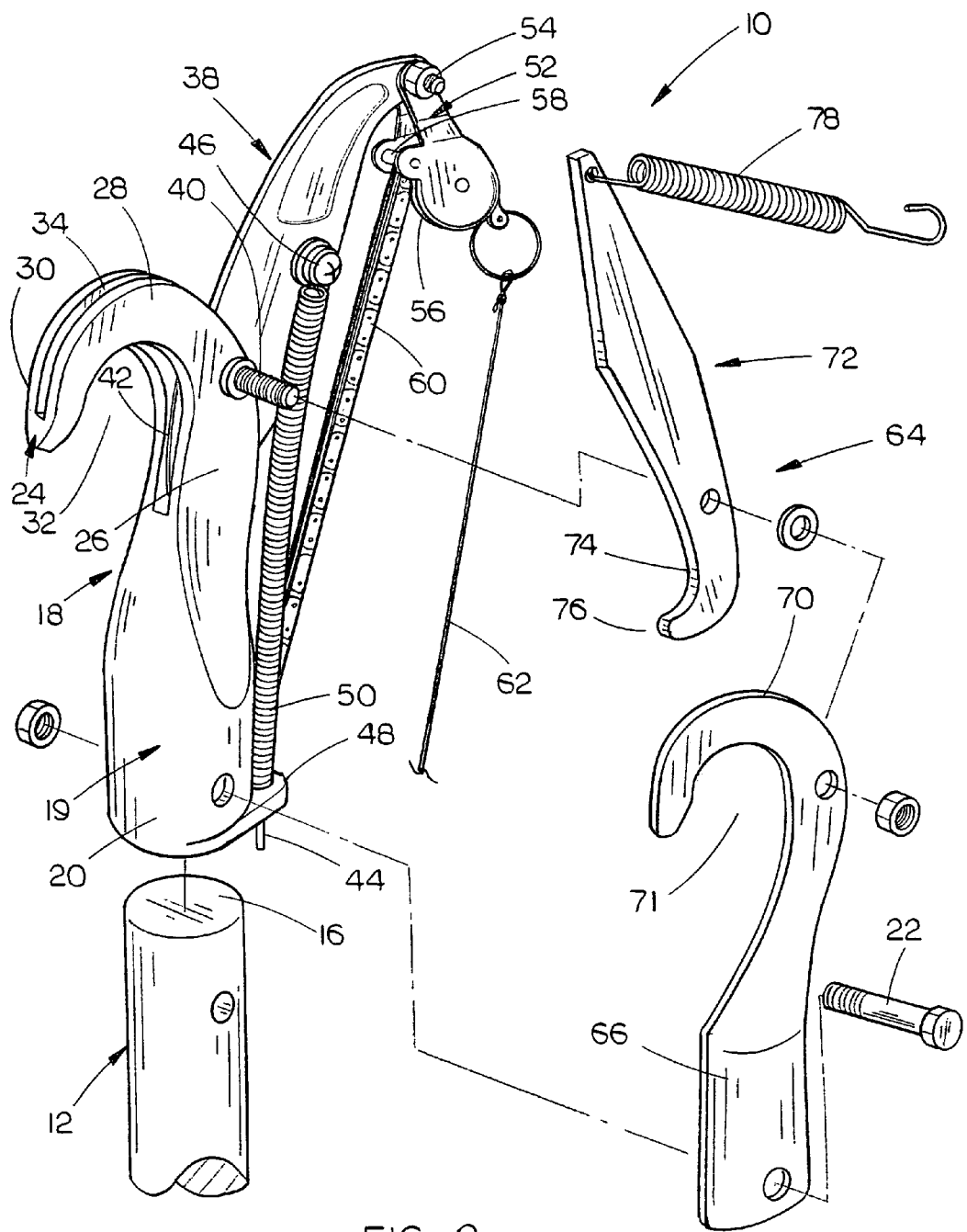
FIG. 2 is an exploded perspective view of the upper end of the pole pruner of this invention.
Figure 3:
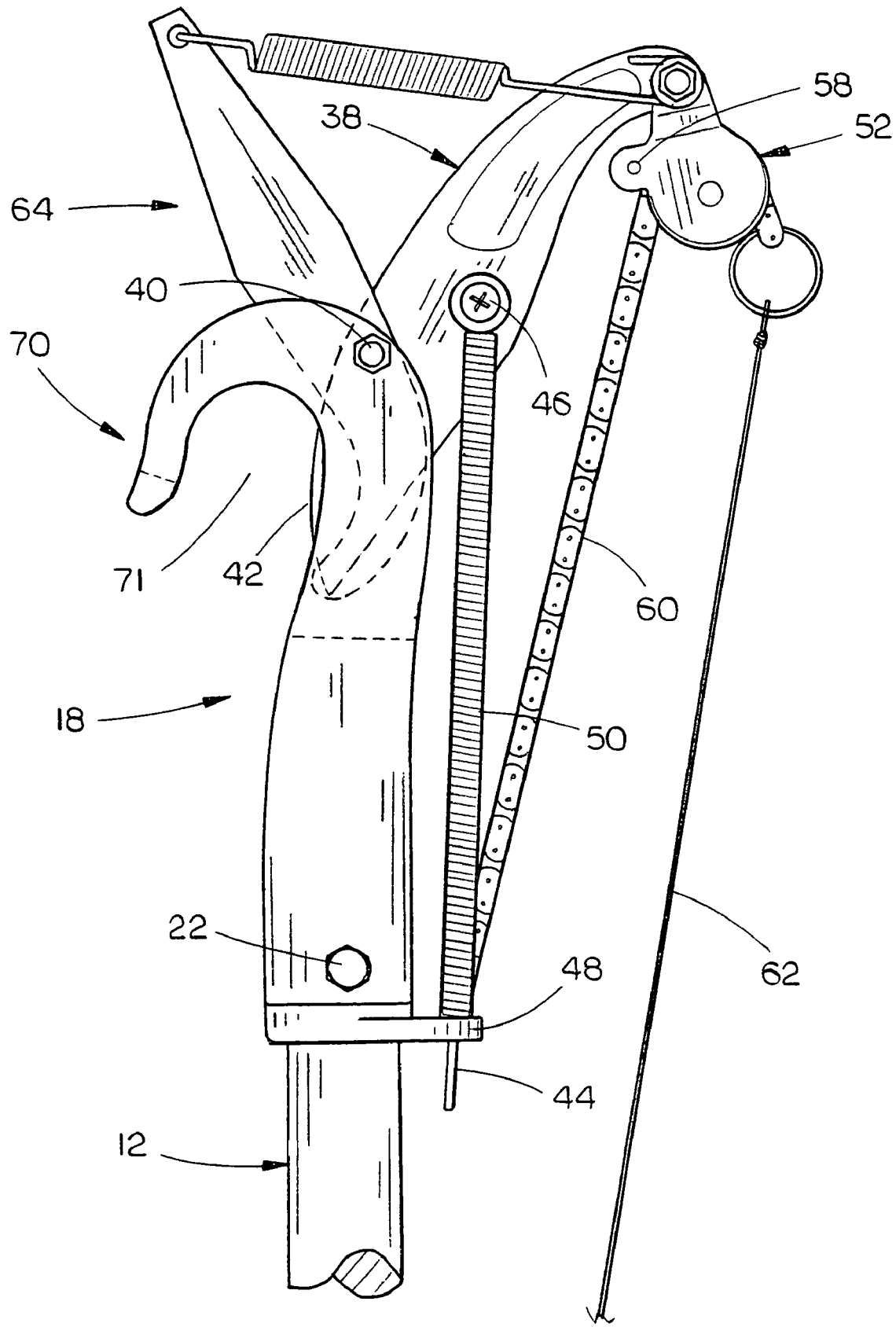
FIG. 3 is a side elevational view of the upper end of the pole pruner in its non-pruning and non-grabbing position.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The pole pruner of this invention is generally designated by the reference numeral 10 and includes a pole 12 having a lower end (not shown) and an upper end 16. A pruner assembly 18 is mounted on the upper end of pole 12. Pole assembly 18 includes a body member 19 having a hollow tubular portion 20 at its lower end which receives the upper end of the pole 12 and which is secured to the pole 12 by means of a bolt 22 extending therethrough. Body member 19 includes a hook 24 at the upper end thereof. For purposes of description, hook 24 will be described as having a first portion 26 which is generally parallel to the tubular portion 20, a second intermediate portion 28 which extends transversely from the first portion 26 and a third end portion 30 which extends downwardly from the outer end of the second portion 28. Portions 26, 28 and 30 define a generally inverted U-shaped opening or operating area 32. A slot 34 is formed in first portion 26, intermediate portion 28 and the third end portion 30.

The numeral 38 refers to an elongated flat cutting blade member having a lower end normally positioned in the lower inner end of slot 34 and which is pivotally secured to body member 18 by pivot bolt 40. The lower end of blade member 38 has an arcuate cutting edge 42 formed therein. An elongated rod 44 is pivotally connected at its upper end to blade member 38 intermediate the ends thereof by pivot bolt 46 and extends downwardly therefrom. The lower end of rod 44 movably extends through an opening formed in ledge 48 which extends laterally from the lower end of tubular portion 20. A compression spring 50 embraces rod 44 between pivot bolt 44 and ledge 48 to yieldably maintain cutting blade member 38 in its non-cutting position as illustrated in FIGS. 1, 2, 3 and 5.

Pulley bracket 52 is pivotally secured to the upper end of cutting blade member 38 by pivot bolt 54 and has a pulley 56 rotatably mounted thereon. Bracket 52 also has a pin 58 which extends between the sides thereof which is spaced from pulley 56. A flexible chain 60 has its lower end secured to ledge 48 and extends upwardly therefrom. Chain 60 extends upwardly into pulley bracket 52 between the sides thereof between pin 58 and pulley 56 and thence around pulley 56. The upper end of chain 60 has a rope or cable 62 secured thereto which extends downwardly to the lower end of the pole 12 to enable the operator of the pole pruner to selectively move the cutting blade member through the U-shaped opening 32 to sever a tree limb from a tree in conventional fashion. Through this point, all the pruner structure described is conventional in design. When a tree limb is to be pruned, the pole pruner will be moved so that the limb 63 is received within the opening 32. When the rope 62 is pulled downwardly, the chain 60 causes the blade 38 to be moved from its non-cutting position to its cutting position whereby the cutting edge 32 moves upwardly into the opening 32 to sever or cut the tree limb therein. Upon the tree limb being severed, the severed portion of the limb normally falls downwardly and could possibly injure the operator of the pole pruner. When the limb has been severed, the downward pull on the rope 62 is released which causes the compression spring 50 to pivotally move the cutting blade member 38 to its non-cutting position.

It is the structure described above which has been modified or supplemented to grab or grasp that part of the tree limb which is severed from a tree to prevent the severed tree limb from falling downwardly towards the operator of the pole pruner. The tree grabber of this invention will be designated generally by the reference numeral 64. First, the pivot bolt 40 is replaced with a longer bolt. Tree grabber 64 includes a support portion 66 which has its lower end secured to tubular portion 20 and pole 12 by the bolt 22. Support portion 66 has a hook 70 at its upper end which is complimentary in shape to hook 24 which includes an inverted U-shaped opening 71. Grabber arm 72 is pivotally secured intermediate its length, to bolt 40 so that its lower end is movably positioned between hook 70 and hook 24. The lower end of grabber arm 72 has an arcuate recess 74 formed therein which defines a shoulder 76 at the lower inner end thereof. A spring 78 is connected at one end thereof to the upper end of grabber arm 72 and is connected at its other end to pivot bolt 54. The weight of that portion of arm 72 which dwells above pivot bolt 40 normally maintains arms 72 in its non-grabbing position of FIG. 1.

Figure 4:
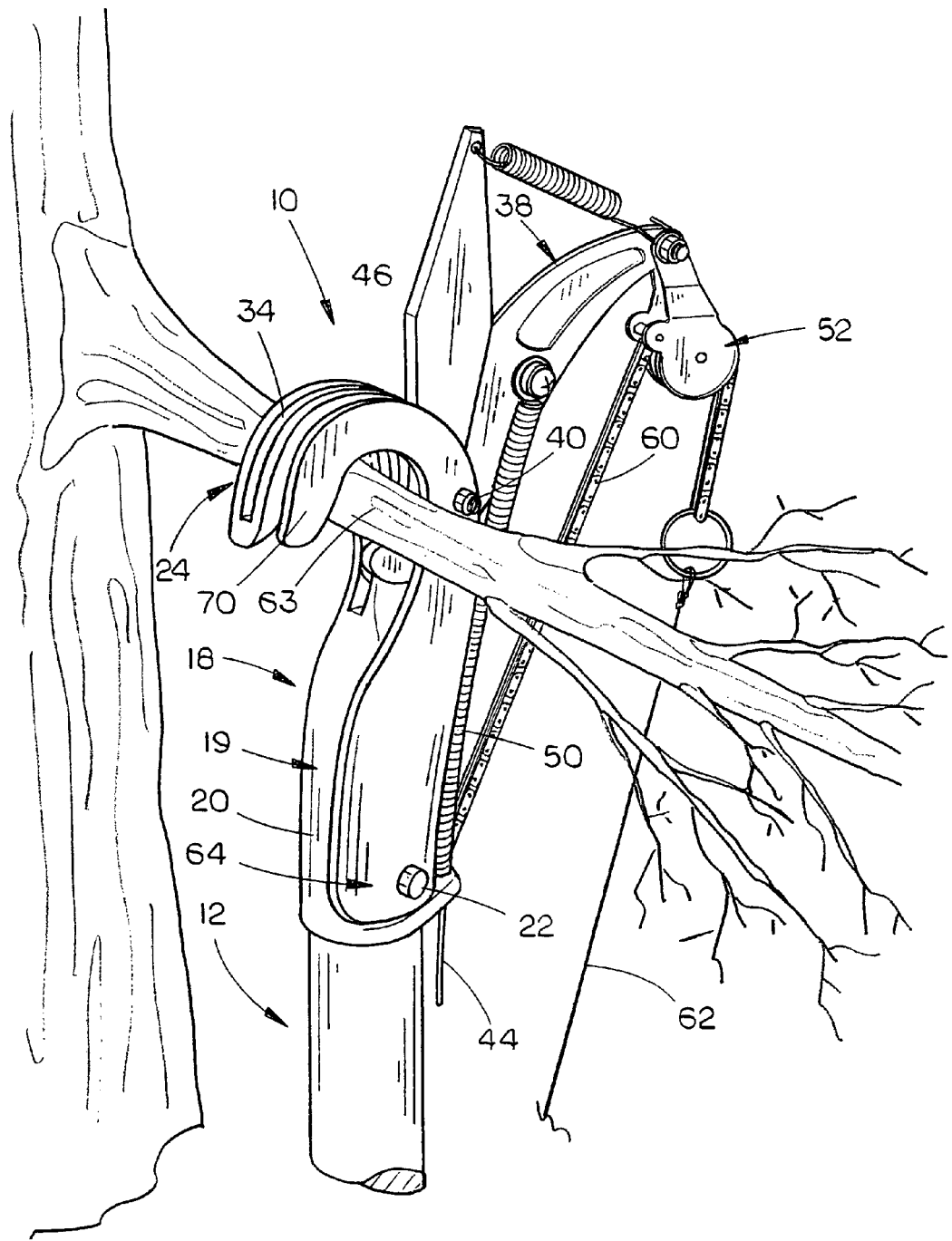
FIG. 4 is a perspective view illustrating how the upper end of the pole pruner is placed over a tree limb to be pruned.
Figure 5:
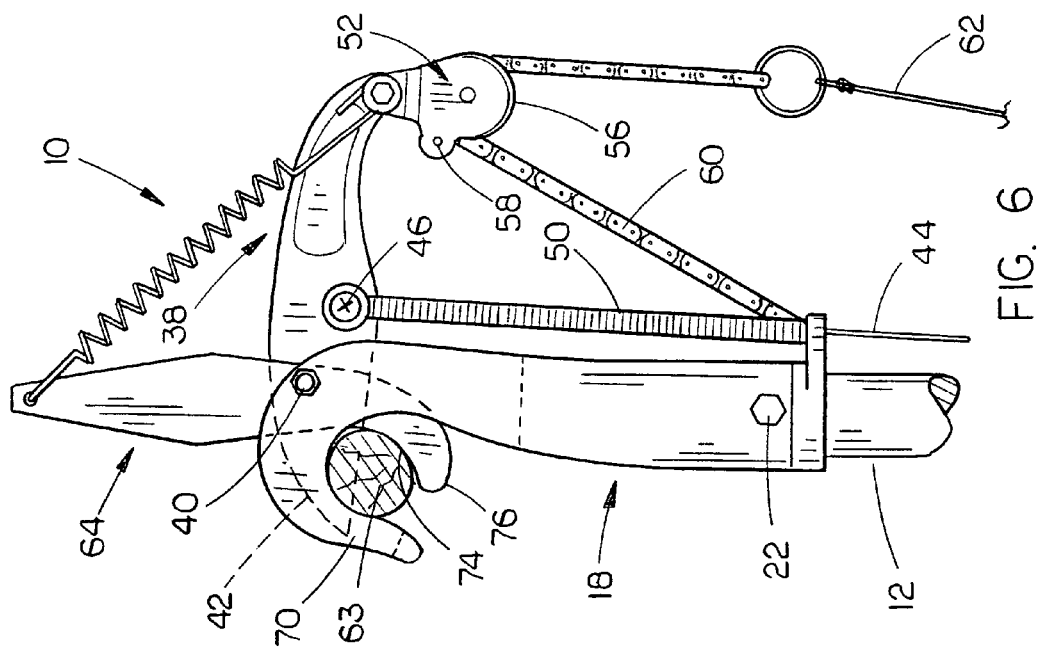
FIG. 5 is a side elevational view of the pole pruner, a limb positioned in the U-shaped opening of the first and second hooks.
Figure 6:
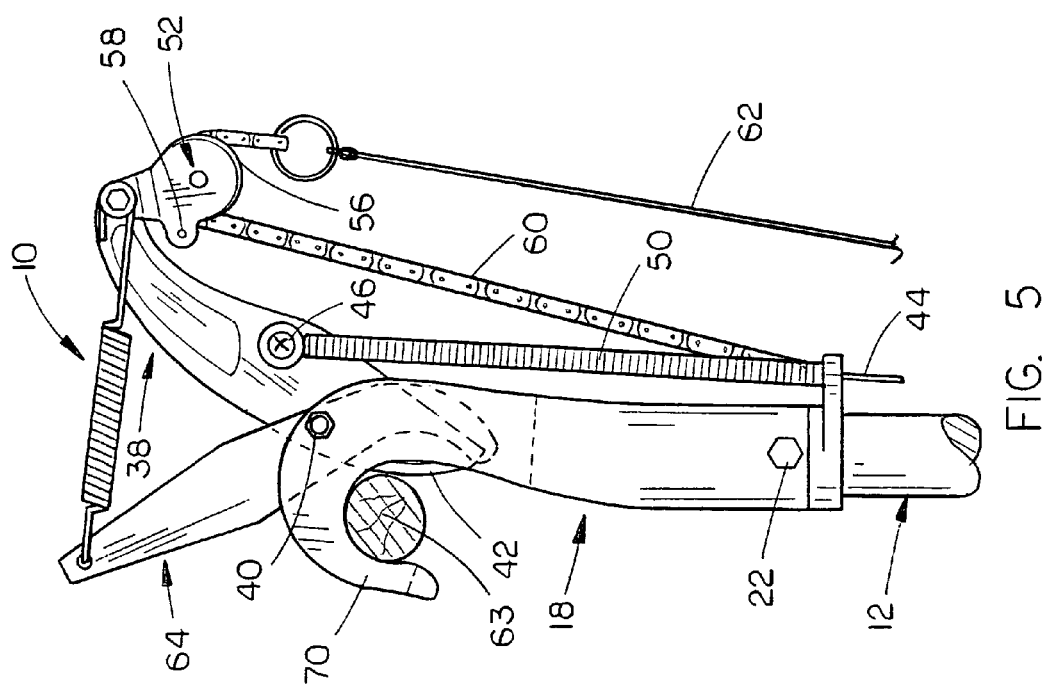
FIG. 6 is a view similar to FIG. 5 except that the cutting blade has been moved through the tree limb to be severed and the grabber arm has been moved into engagement with the severed tree limb to prevent the same from falling downwardly from the tree.

In operation, the pole pruner will be manipulated and placed upon the tree limb 63 to be severed (FIGS. 4 and 5) so that the tree limb 63 is positioned in the U-shaped opening 32 of hook 24 and opening 71 of hook 70 with the hook 70 being positioned on the tree limb outwardly of the hook 24. As rope 62 is pulled downwardly to pivot cutting blade member 38 move through the slot 34 in the hook 24, arm 72 is pivoted simultaneously with cutting blade member 38 so that the recessed portion 74 at the lower end of grabber arm 72 moves into engagement with that portion of the tree limb which is to be pruned or severed. When the grabber arm 72 has made contact with the tree limb, it will not pivot any more which is permitted by the stretching of the spring 78. When the tree limb has been severed, as seen in FIG. 6, the severed tree limb will be held in hook 70 by the grabber arm 72. The operator will then maintain downward pressure on the rope and maneuver the pruner with the severed branch held therein until the desired position has been reached, at which time the operator will release pressure on the rope 62 thereby permitting the grabber arm to pivotally move to its inoperative position at which time the severed tree limb will fall from the hook 70.

It can therefore be seen that a novel and improved pole pruner has been provided which permits the operator of the pole pruner to maneuver the severed tree limb to a location where it may be released therefrom without danger to the operator of the pole pruner. It can therefore be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A pole pruner, comprising:
   an elongated pole having an upper end and a lower end;
   a body member at said upper end of said pole which extends upwardly therefrom;
   said body member having a first hook, with first and second sides, provided
     thereon which defines an inverted U-shaped opening which is adapted to receive a tree limb therein;
   said first hook having a vertically disposed slot formed therein which communicates with said inverted U-shaped opening;
   an elongated generally flat cutting blade member having upper and lower ends;
   said cutting blade member being pivotally secured, intermediate its length to said body member so as to have its lower end selectively movably positioned in said slot;
   said cutting blade member having a cutting edge formed therein at the lower end thereof;
   said cutting blade member being pivotally movable from a non-pruning position to a pruning position;
   said cutting edge being positioned within said slot when said cutting blade is in its said non-pruning position;
   said cutting edge being movable into said inverted U-shaped opening of said first hook when said cutting blade member is moved from its said non-pruning position to its said pruning position to cut and detach a portion of a limb positioned in said inverted U-shaped opening of said first hook;

a first spring secured to said cutting blade member to yieldably maintain said cutting blade member in its said non-pruning position;

an elongated rope secured to said cutting blade member to enable a person to pivotally move said cutting blade member from its said non-pruning position to its said pruning position;

a second hook secured to said body member laterally of said first hook;

said second hook defining an inverted U-shaped opening which is in lateral alignment with said U-shaped opening in said first hook;

an elongated grabber arm, having upper and lower ends;

said grabber arm being pivotally secured to said first hook at one side thereof and between said first and second hooks;

said grabber arm being movable between an inoperative position to an operative position;

said grabber arm normally being in its said inoperative position;

said lower end of said grabber arm being positioned laterally of said U-shaped openings of said first hook and said second hook;

a spring secured to and extending between said cutting blade member and said grabber arm so that when said cutting blade member is moved from its said non-pruning position towards its said pruning position, said grabber arm will be yieldably moved from its said inoperative position to its said operative position to force that portion of the limb which is to be detached against said second hook to grab the same as it is being cut from the limb.

2. The pole pruner of claim 1 wherein said lower end of said grabber arm has a shoulder formed thereon to aid in grabbing the severed tree limb.

3. The pole pruner of claim 1 which said lower end of said grabber arm has an arcuate recessed area formed therein.

* * * * *